No. 731,190. PATENTED JUNE 16, 1903.
J. C. KUHLMAN.
PIPE CLEANER.
APPLICATION FILED MAR. 14, 1903.
NO MODEL.

Witnesses
E. F. Stewart
C. N. Woodward

J. C. Kuhlman, Inventor
by C. A. Snow & Co
Attorneys

No. 731,190. Patented June 16, 1903.

UNITED STATES PATENT OFFICE.

JOHN CHARLES KUHLMAN, OF TERRE HAUTE, INDIANA.

PIPE-CLEANER.

SPECIFICATION forming part of Letters Patent No. 731,190, dated June 16, 1903.

Application filed March 14, 1903. Serial No. 147,836. (No model.)

*To all whom it may concern:*

Be it known that I, JOHN CHARLES KUHLMAN, a citizen of the United States, residing at Terre Haute, in the county of Vigo and State of Indiana, have invented a new and useful Pipe-Cleaner, of which the following is a specification.

This invention relates to devices employed for clearing pipes from accumulations of soot and other deposits and precipitations and which may be made in different sizes and forms to adapt it to be applied to various forms and sizes of pipes, but which is more particularly applicable to stovepipes, and has for its object to produce a simply-constructed and easily applied and operated implement which will automatically adapt itself to any irregularities in the interior of the pipes; and the invention consists in a disk of resilient sheet metal in the form of a wheel having a plurality of spaced clefts in its periphery forming tongues which project from the rim thereof, and the wheel-like disk is preferably slightly larger than the pipe in which it is to be employed and adapted to be forcibly moved through the pipe, and it is provided with a strengthening and supporting central hub and perforated to receive an operating-handle.

Other novel features of the invention will appear in the annexed description and be specified in the claim following.

Figure 1:
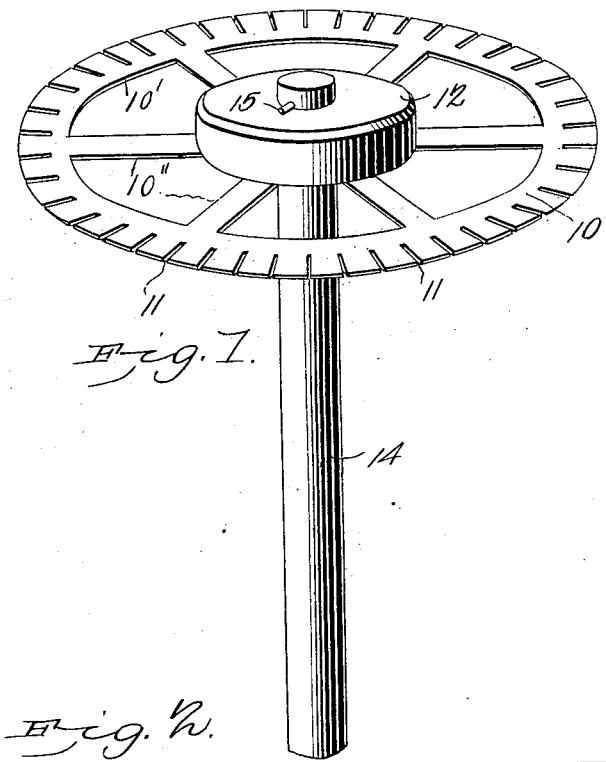
Figure 2:
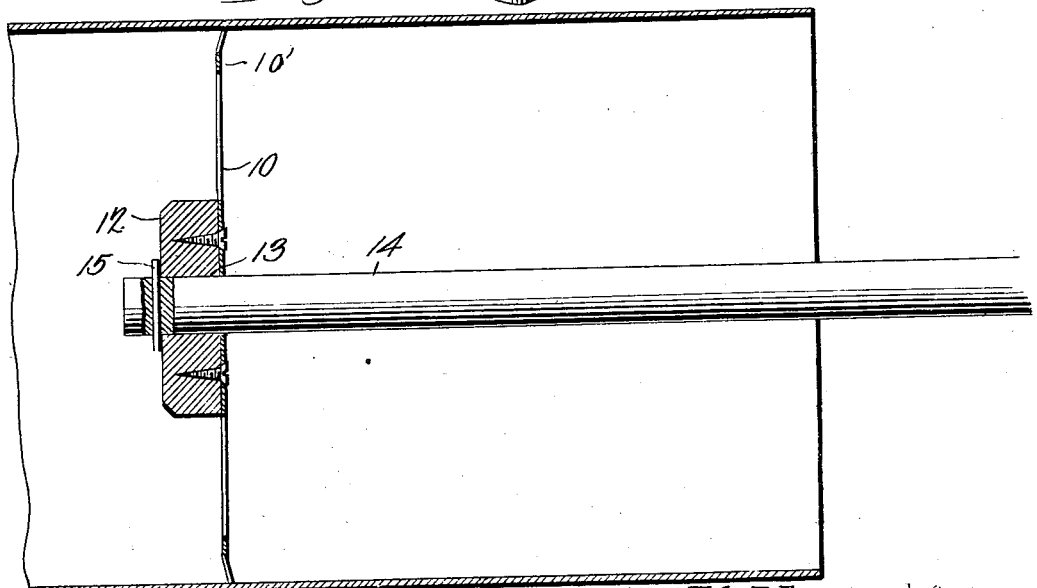

Figure 1 is a perspective view of the device. Fig. 2 is a side elevation of the device applied.

The improved device consists of a disk 10 of resilient sheet metal, such as steel, preferably made slightly larger than the interior of the pipe to which it is to be applied and provided with a plurality of spaced clefts 11, radially disposed in its periphery, whereby a corresponding series of independent tongues are formed projecting from the continuous rim 10', as shown in Fig. 1. The clefts may be of any desired length, but will be sufficient to form tongues of a sufficient length to adapt them to yield to any irregularities in the interior surface of the pipe and freely pass them, and thus cause the device to adapt itself automatically to the pipe and operate upon all parts of the surface, as will be obvious. The disk 10 will be provided with a hub 12, having a central aperture 13, adapted to support an operating-handle 14 of any suitable length. The hub 12 may be of wood, metal, or other material and secured in any suitable manner to the disk, and the disk will preferably be cut out, as shown, to reduce the weight and forming radiating arms or spokes 10'', terminating in the rim 10'. By this simple arrangement a very simple and effective implement is constructed by which pipes of various kinds may be quickly and easily cleared from accumulations of soot and other sediment or deposits, and it will be found especially valuable and convenient for clearing stovepipes from soot and ashes.

The handle member 14 may be of any length to conform to the length of the pipe to be cleaned and may be secured by any suitable means, such as a pin 15.

By cutting out the greater portion of the disk 10 the whole disk is rendered more flexible, and the arms or spokes left between the cut-out portions will bend with the action of the cleaner when drawn back and forth through the flue, and thus assist in the operation.

Having thus described my invention, what I claim is—

A pipe-cleaner consisting of a sheet-metal wheel-like structure having a central hub and radiating spaced spokes terminating in a rim having spaced tongues arranged around the periphery thereof.

In testimony that I claim the foregoing as my own I have hereto affixed my signature in the presence of two witnesses.

JOHN CHARLES KUHLMAN.

Witnesses:
 STELLA C. ARMSTRONG,
 ROBERT J. SMITH.